US010316957B2

(12) United States Patent
Cho et al.

(10) Patent No.: US 10,316,957 B2
(45) Date of Patent: Jun. 11, 2019

(54) SHIFTING CONTROL METHOD FOR VEHICLES WITH DUAL CLUTCH TRANSMISSION

(71) Applicants: HYUNDAI MOTOR COMPANY, Seoul (KR); KIA MOTORS CORPORATION, Seoul (KR)

(72) Inventors: Sung Hyun Cho, Yongin-si (KR); Sang Mo Ha, Seongnam-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 126 days.

(21) Appl. No.: 15/637,662

(22) Filed: Jun. 29, 2017

(65) Prior Publication Data
US 2018/0163853 A1 Jun. 14, 2018

(30) Foreign Application Priority Data
Dec. 13, 2016 (KR) .......................... 10-2016-0169991

(51) Int. Cl.
B60W 10/02 (2006.01)
B60W 10/06 (2006.01)
(Continued)

(52) U.S. Cl.
CPC .............. F16H 59/56 (2013.01); B60W 10/02 (2013.01); B60W 10/06 (2013.01);
(Continued)

(58) Field of Classification Search
CPC .... B60W 10/02; B60W 10/06; B60W 10/113; B60W 2510/1005; B60W 2540/10; B60W 2710/027; B60W 2710/0666
See application file for complete search history.

(56) References Cited

U.S. PATENT DOCUMENTS 9,822,875 B2 * 11/2017 Cho ........................ F16H 63/46
9,835,210 B2 * 12/2017 Cho ....................... F16D 48/068
(Continued)

FOREIGN PATENT DOCUMENTS

JP 2013-079707 A 5/2013
KR 10-2008-0111102 A 12/2008
(Continued)

Primary Examiner — David R Morris
(74) Attorney, Agent, or Firm — Brinks Gilson & Lione

(57) ABSTRACT

A vehicle is equipped with a dual clutch transmission controlled by a shifting control method to achieve quick shifting and direct engaging through quick synchronous control of the rotational speed of an engine and cooperative control of engine torque when a driver intends to rapidly accelerate the vehicle while shifting. The method includes: a rapid acceleration determining step in which a controller determines whether the vehicle is rapidly accelerated based on an output value according to a driving state of the vehicle until a torque handover period is entered, when shifting is started; and an interlocking step of controlling the engagement clutch torque over a predetermined desired engagement clutch torque to cause interlocking based on a torque value determined in accordance with a rapid acceleration level determined in the torque handover period, when the controller determines that the vehicle is rapidly accelerated.

5 Claims, 3 Drawing Sheets

(51) Int. Cl.
*B60W 10/113* (2012.01)
*F16H 59/56* (2006.01)
*F16H 61/02* (2006.01)
*F16H 61/12* (2010.01)
*F16H 61/688* (2006.01)
*F16H 59/20* (2006.01)
*F16H 61/04* (2006.01)
*F16H 59/18* (2006.01)
*F16H 63/50* (2006.01)

(52) U.S. Cl.
CPC ........... *B60W 10/113* (2013.01); *F16H 59/20* (2013.01); *F16H 61/0213* (2013.01); *F16H 61/0403* (2013.01); *F16H 61/0437* (2013.01); *F16H 61/12* (2013.01); *F16H 61/688* (2013.01); *B60W 2510/0604* (2013.01); *B60W 2510/0609* (2013.01); *B60W 2510/1005* (2013.01); *B60W 2540/10* (2013.01); *B60W 2710/027* (2013.01); *B60W 2710/0666* (2013.01); *F16H 59/18* (2013.01); *F16H 63/502* (2013.01); *F16H 2059/183* (2013.01); *Y02T 10/76* (2013.01)

(56) References Cited

U.S. PATENT DOCUMENTS

2016/0123465 A1* 5/2016 Cho ................... F16H 63/46
477/176
2016/0377129 A1* 12/2016 Cho ................... F16D 48/068
701/51

FOREIGN PATENT DOCUMENTS

| KR | 10-2014-0034548 A | 3/2014 |
| KR | 10-1592695 B1 | 2/2016 |
| KR | 10-2016-0053327 A | 5/2016 |
| KR | 10-2016-0064359 | 6/2016 |

* cited by examiner

SHIFTING CONTROL METHOD FOR VEHICLES WITH DUAL CLUTCH TRANSMISSION

CROSS REFERENCE TO RELATED APPLICATION

The present application claims priority to and the benefit of Korean Patent Application No. 10-2016-0169991, filed Dec. 13, 2016, the entire contents of which is incorporated herein by reference.

FIELD

The present disclosure relates to a shifting control method for a vehicle with a DCT.

BACKGROUND

The statements in this section merely provide background information related to the present disclosure and may not constitute prior art.

A Dual Clutch Transmission (DCT) transmits power from an engine directly to a driving shaft using two clutches without a torque converter, unlike common automatic transmissions.

That is, two input shafts are connected to respective clutches, and gears on the input shafts are divided into odd-numbered gears and even-numbered gears so that one of the two input shafts is used for shifting into odd-numbered gears and the other one is used for shifting into even-numbered gears.

As described above, since the DCT transmits the power from an engine using two clutches, it increases the certainty of directly engaging gears, compared to common automatic transmissions.

Accordingly, a driver who drives a vehicle equipped with a DCT expects quicker shifting and operation in comparison to a vehicle equipped with an existing automatic transmission, so it is desired to perform control that can provide quick shifting and direct engaging by controlling the DCT.

SUMMARY

The present disclosure provides a shifting control method for a vehicle with a DCT that achieves quick shifting and direct engaging through quick synchronous control of the rotational speed of an engine and cooperative control of engine torque when a driver intends to rapidly accelerate a vehicle while shifting.

In one form of the present disclosure, a shifting control method for a vehicle with a dual clutch transmission includes: a rapid acceleration determining step in which a controller determines whether the vehicle is rapidly accelerated on the basis of an output value according to a driving state of the vehicle until a torque handover period is entered, when shifting is started; and an interlocking step in which when the controller determines that the vehicle is rapidly accelerated through the rapid acceleration determining step, the controller controls an engagement clutch torque so as to be greater than a predetermined desired engagement clutch torque to cause interlocking on the basis of a torque value determined in accordance with a rapid acceleration level determined in the torque handover period.

Whether the vehicle is rapidly accelerated may be determined based on an amount of opening of an acceleration position sensor (APS) in the rapid acceleration determining step, and the engagement clutch torque may be increased by adding a torque value determined based on the amount of opening of the APS to the predetermined desired engagement clutch torque in the interlocking step.

In the interlocking step, the engagement clutch torque may be determined by the following equation:

Engagement clutch torque $(t)$=engagement clutch torque $(t-1)$+{desired final engagement clutch torque $(*)$+boosting torque value according to amount of opening of APS−engagement clutch torque $(t-1)$}/(desired time for keeping torque handover−time of keeping torque handover), where, the desired final engagement clutch torque $(*)$=Te (engine torque)−Je (rotational inertia)*$dNe/dt$ (angular acceleration of engine).

The method may further include: immediately after the torque handover period, a rapid acceleration maintenance step of determining whether rapid acceleration is maintained; and a second engine control step of dropping the engine torque to negative (−) torque so that the rotational speed of the engine follows the engagement input shaft speed, when it is determined that rapid acceleration is maintained.

The method may further include: a shifting completion time determining step of determining expected shifting completion time after the first engine control step; and a second engine control step of gradually returning the engine torque dropped in the first engine control step to a desired engine torque when the expected shifting completion time is equal to or less than a reference time.

The engine torque may be dropped to the negative (−) torque through fuel-cut control in the first engine control step.

According to the present disclosure, when rapid acceleration is desired, the engagement clutch torque in the torque handover period is controlled over the desired engagement clutch torque to generate interlocking, so it is possible to perform direct shifting while providing a more sporty shifting experience to a driver.

Further, in the inertia phase period, the engine torque may be dropped to the drag torque, so the rotational speed of the engine may be rapidly dropped to quickly follow the engagement input shaft speed. Accordingly, the time for synchronization may be reduced and direct shifting can be achieved.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
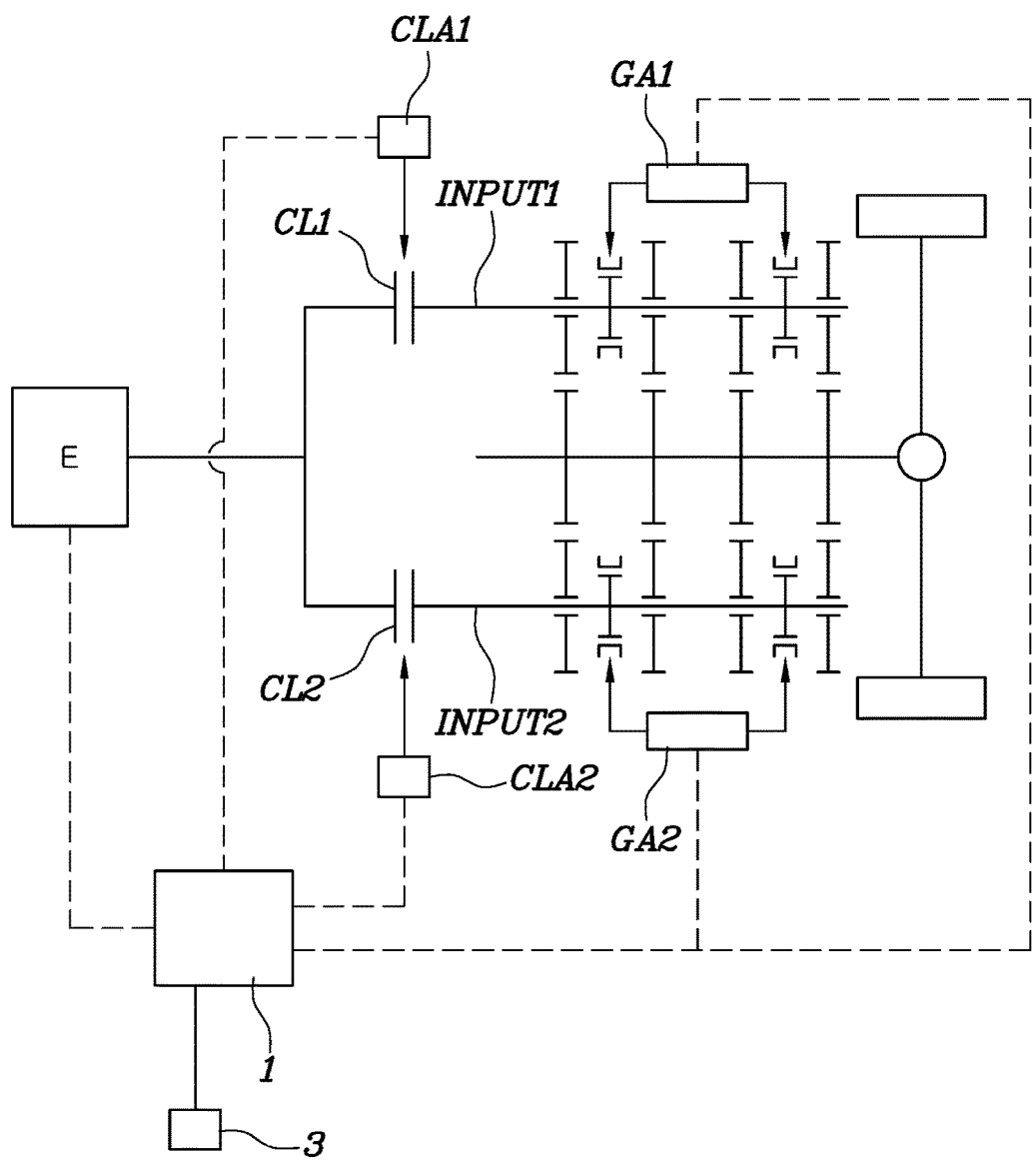
FIG. 1 is a diagram showing the configuration of a powertrain for a vehicle equipped with a DCT to which the present disclosure can be applied.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 is a diagram showing the configuration of a powertrain for a vehicle equipped with a DCT to which the present disclosure can be applied and to which the compartments shown in the figure are briefly described. An engagement clutch and a disengagement clutch of two clutches of the DCT are indicated by 'CL1' and 'CL2', respectively, an engagement clutch actuator and a disengagement clutch actuator for operating the clutches are indicated by 'CLA1' and 'CLA2', respectively, and an engagement input shaft and a disengagement input shaft are indicated by 'INPUT1' and 'INPUT2', respectively. However, this is only for convenience of understanding the present disclosure, and the engagement and the disengagement may be changed, depending on which clutch is the clutch engaged with the current gear and which clutch is to be engaged with a desired gear.

The shifting control method for a vehicle with a DCT may broadly include a rapid acceleration determining step and an interlocking step.

Figure 2:
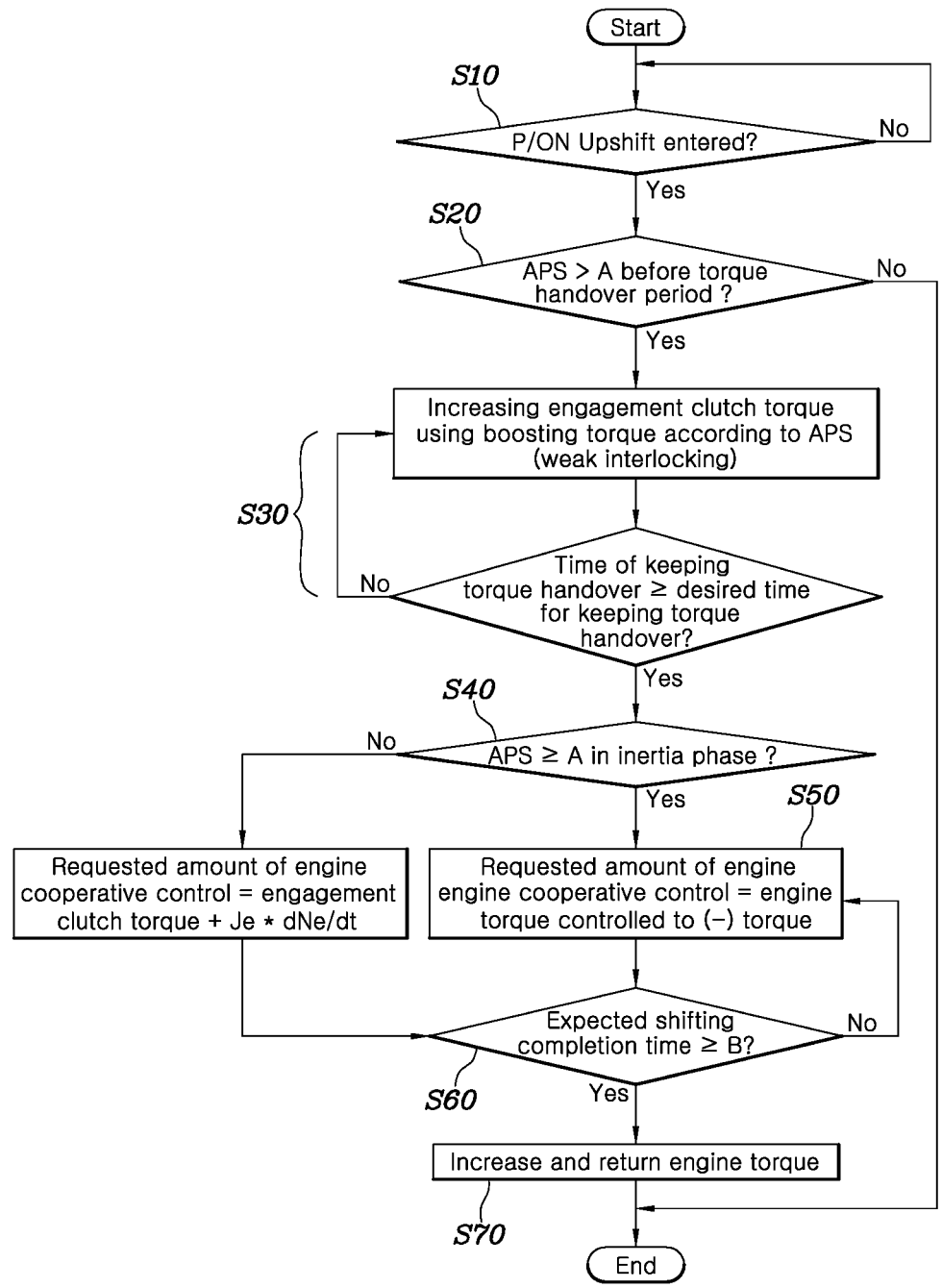
FIG. 2 is a view illustrating the flow of shifting control in a vehicle equipped with a DCT in one form of the present disclosure.

Referring to FIGS. 1 and 2 to describe the present disclosure in detail, first, in the rapid acceleration determining step, a controller 1 can determine whether a vehicle is rapidly accelerated on the basis of an output value according to the driving state of the vehicle until a torque handover period is entered, when shifting is started.

For example, the shifting may be power-on upshift, which means that a driver shifts into an upper gear from the current gear in accordance with a shifting pattern while pressing down the accelerator pedal.

That is, in power-on upshift, torque handover control (torque phase period) for reversely controlling two clutch torques by increasing engagement clutch torque and decreasing disengagement clutch torque can be performed, and then an inertia phase period, to be described below, can be entered.

Next, in the interlocking step, when the controller 1 determines that the vehicle is rapidly accelerated through the rapid acceleration determining step, the controller 1 can control the engagement clutch torque over predetermined desired engagement clutch torque to cause interlocking on the basis of a torque value determined in accordance with a rapid acceleration level determined in the torque handover period.

Figure 3:
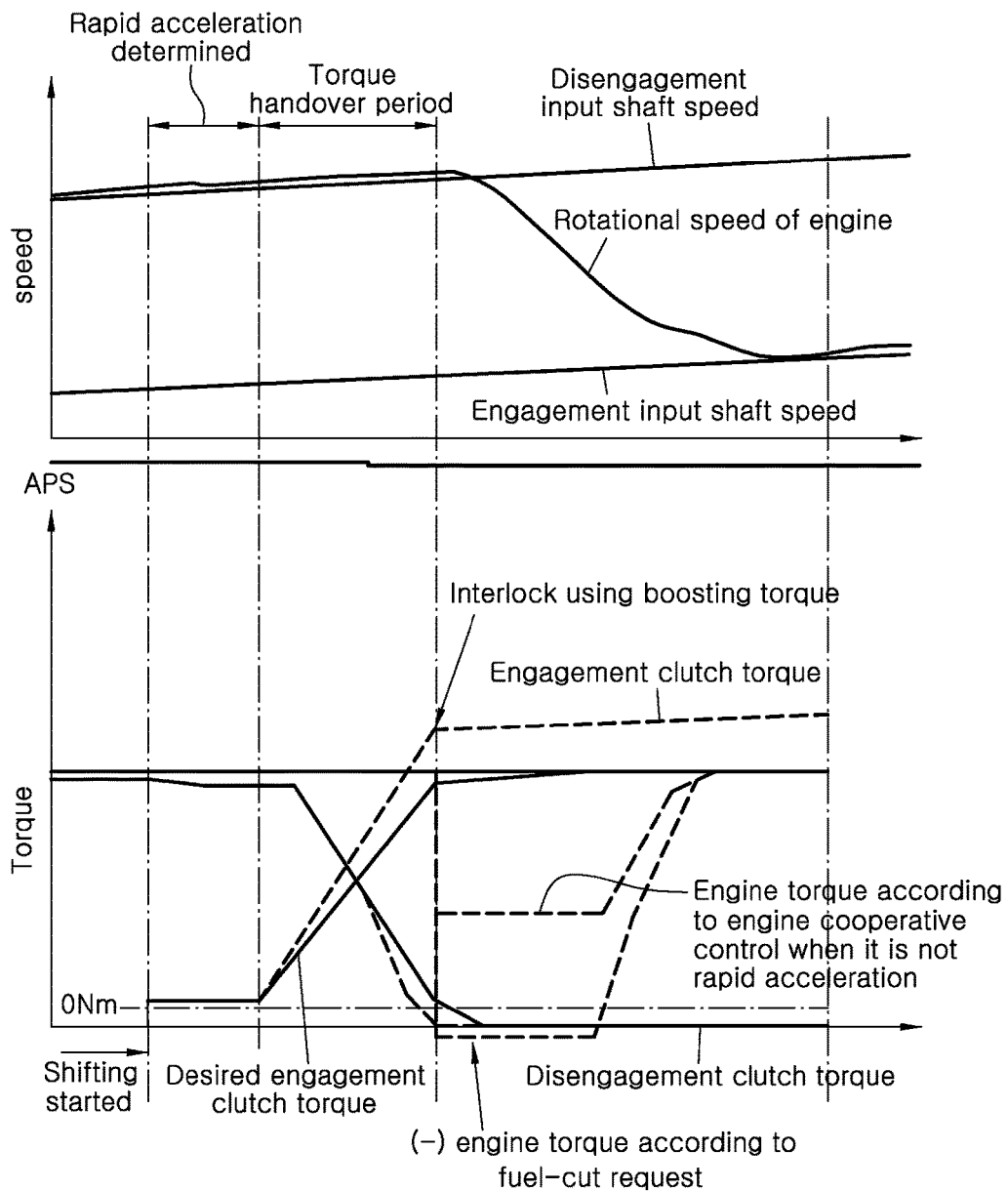
FIG. 3 is a graph illustrating the operation according to a shifting control method of the present disclosure.

That is, as seen in FIG. 3, when shifting into a desired gear is started in accordance with a power-on upshift order, the controller 1 determines whether the driver intends to rapidly accelerate, and when it is determined that the driver intends to rapidly accelerate, the controller controls the engagement clutch torque so as to be greater than the desired engagement clutch torque in the torque handover period.

Accordingly, the sum of the engagement clutch torque and the disengagement clutch torque becomes greater than the engine torque and interlocking is generated, whereby a driver can feel direct and sportier shifting.

At this time, the interlocking becomes weak, such that the driving parts of the engine and the transmission are not damaged and it is possible to control the disengagement clutch torque so as to be less than the desired disengagement clutch torque after the point where the engagement clutch torque and the disengagement clutch torque cross each other.

Meanwhile, in one form of the present disclosure, it is possible to determine whether the vehicle is to be rapidly accelerated due to the rapid acceleration intention of the driver on the basis of the amount of an Accelerator Pedal Position Sensor (APS).

For example, when the amount of opening of the APS 3 exceeds a reference value, it is possible to determine that the vehicle is being rapidly accelerated by the rapid acceleration intention of the driver.

Further, in the interlocking step of the present disclosure, it is possible to increase the engagement clutch torque by adding the torque value, which is determined based on the amount of opening of the APS, to the desired engagement clutch torque.

The engagement clutch torque that is increased in the interlocking step can be determined by the following equations:

Engagement clutch torque ($t$)=engagement clutch torque ($t-1$)+{desired final engagement clutch torque (*)+boosting torque value according to amount of opening of APS−engagement clutch torque ($t-1$)}/(desired time for keeping torque handover control−time of keeping torque handover control), The desired final engagement clutch torque (*)=$Te$ (engine torque)−$Je$ (rotational inertia)*$dNe/dt$ (angular acceleration of engine), where, the engagement clutch torque (t−1) is engagement clutch torque applied in the previous cycle.

The increase in engagement clutch torque in the remaining torque handover control period in each cycle is calculated using the function of the desired final engagement clutch torque in the torque handover period, the boosting torque value determined in accordance with the amount of opening of the APS, and the engagement clutch torque applied in the previous cycle. Thus, the engagement clutch torque can be increased by the calculated value.

Further, in one form of the present disclosure, when rapid acceleration is maintained immediately after the torque handover control, it is possible to reduce shifting time through cooperative control of the engine in the inertia phase period.

To this end, the present disclosure may include a rapid acceleration maintenance determining step and a first engine control step.

In detail, in the rapid acceleration maintenance determining step, when the inertia phase period is entered immediately after the torque handover period, it is possible to determine whether rapid acceleration is maintained.

For example, when the amount of opening of the APS exceeds a reference value, it is possible to determine that rapid acceleration is maintained.

In the first engine control step, when it is determined that rapid acceleration is maintained, it is possible to decrease the engine torque to negative (−) torque so that the rotational speed of the engine follows the engagement input shaft speed.

In one form, it is possible to decrease the engine torque to negative (−) torque through fuel-cut control.

On the other hand, when it is determined that rapid acceleration is not maintained, it is possible to control the engine torque by calculating an engine torque cooperative control amount through the following equation:

Requested amount of cooperative control engine torque=engagement clutch torque (t)−Je (rotational inertia)*dNe/dt (angular acceleration of engine).

That is, in the engine cooperative control during the inertia phase period, the engine torque is dropped to the lowest level by the fuel-cut control, so the angular acceleration of the engine is increased and the rotational speed of the engine quickly drops, and accordingly, the rotational speed of the engine quickly follows the engagement input shaft speed. Accordingly, the time for synchronization is reduced, so the shifting time can be decreased and direct engaging can be achieved.

Further, the present disclosure may further include a shifting completion time determining step of determining an expected shifting completion time after the first engine control step, and a second engine control step of gradually increasing and returning the engine torque dropped in the first engine control step to a desired engine torque with a predetermined inclination, when the expected shifting completion time is a predetermined time or less.

A shifting control flow in one form of the present disclosure is sequentially described hereafter.

Referring to FIGS. 2 and 3, when power-on upshift is performed (S10), whether a vehicle is rapidly accelerated is determined on the basis of the amount of opening of the APS until the torque handover period is entered (S20).

When it is determined that the vehicle is rapidly accelerated in step S20, the engagement clutch torque is controlled over predetermined desired engagement clutch torque using boosting torque according to the amount of opening of the APS within the torque handover period to generate interlocking (S30). That is, interlocking is caused in the torque handover period, direct shifting is achieved and a driver can enjoy a sportier shifting experience.

Next, when the inertia phase period is entered after the torque handover period, it is determined whether rapid acceleration is maintained on the basis of the amount of opening of the APS (S40).

When it is determined that rapid acceleration is maintained in step S40, fuel-cut control is requested and the engine torque is correspondingly dropped to drag torque (S50), so the rotational speed of the engine, which is synchronized with the disengagement input shaft speed, is controlled over the engagement input shaft speed.

Thereafter, it is determined whether the expected shifting completion time reaches B (S60) and when it reaches B, the engine torque dropped to the drag torque is increased and returned to the desired engine torque (S70), thereby finishing shifting.

As described above, when rapid acceleration is desired, the engagement clutch torque in the torque handover period is controlled over the desired engagement clutch torque to generate interlocking, so it is possible to enable direct shifting and provide a sportier shifting experience to a driver.

Further, in engine cooperative control during the inertia phase period, the engine torque is dropped to the drag torque, so the rotational speed of the engine is rapidly dropped to quickly follow the engagement input shaft speed. Accordingly, the time for synchronization is reduced and direct shifting can be achieved.

Although exemplary forms of the present disclosure have been described for illustrative purposes, those skilled in the art will appreciate that various modifications, additions and substitutions are possible, without departing from the scope and spirit of the present disclosure.

What is claimed is:

1. A shifting control method for a vehicle with a dual clutch transmission, the method comprising:
a rapid acceleration determining step in which a controller determines whether the vehicle is rapidly accelerated on the basis of an output value according to a driving state of the vehicle until a torque handover period is entered, when shifting is started;
an interlocking step in which when the controller determines that the vehicle is rapidly accelerated through the rapid acceleration determining step, the controller controls an engagement clutch torque so as to be greater than a predetermined desired engagement clutch torque to cause interlocking on the basis of a torque value determined based on a rapid acceleration level determined in the torque handover period;
immediately after the torque handover period, a rapid acceleration maintenance step of determining whether rapid acceleration is maintained; and
a first engine control step of dropping an engine torque to a negative (−) torque so that a rotational speed of an engine follows an engagement input shaft speed, when the rapid acceleration is maintained.

2. The method of claim 1, wherein whether the vehicle is rapidly accelerated is determined based on an amount of opening of an acceleration position sensor (APS) in the rapid acceleration determining step, and
the engagement clutch torque is increased by adding a torque value determined based on the amount of opening of the APS to the predetermined desired engagement clutch torque in the interlocking step.

3. The method of claim 1, wherein in the interlocking step, the engagement clutch torque is calculated as:

Engagement clutch torque (t)=engagement clutch torque (t−1)+{desired final engagement clutch torque (*)+boosting torque value according to amount of opening of APS−engagement clutch torque (t−1)}/(desired time for keeping torque handover−time of keeping torque handover)

where: the desired final engagement clutch torque (*)=Te (engine torque)−Je (rotational inertia)*dNe/dt (angular acceleration of engine).

4. The method of claim 1, further comprising:
a shifting completion time determining step of determining an expected shifting completion time after the first engine control step; and
a second engine control step of gradually returning the engine torque dropped in the first engine control step to a desired engine torque when the expected shifting completion time is equal to or less than a reference time.

5. The method of claim 1, wherein the engine torque is dropped to the negative (−) torque through fuel-cut control in the first engine control step.

* * * * *